Patented Apr. 29, 1952

2,594,278

UNITED STATES PATENT OFFICE 2,594,278

HERBICIDAL COMPOSITIONS CONTAINING CHLORINATED ARYL ESTERS OF ALIPHATIC MONOCARBOXYLIC ACIDS

Luther L. Baumgartner, Hastings, N. Y., assignor to The B. F. Goodrich Company, New York, N. Y., a corporation of New York No Drawing. Application March 4, 1950, Serial No. 147,754

8 Claims. (Cl. 71—2.3)

This invention relates to herbicidal compositions and more specifically pertains to herbicidal compositions containing as an essential active ingredient, a polychloroaryl ester of an aliphatic monocarboxylic acid.

I have discovered that when polychloroaryl esters of aliphatic monocarboxylic acids are mixed with a mineral oil consisting predominantly of hydrocarbons containing from 10 to 20 carbon atoms such as kerosene and fuel oils, in concentrations as low as 0.01% by weight, the resulting compositions are exceedingly effective herbicides. These compositions are especially useful in killing a wide variety of grasses and broad leaf plants including varieties which are not controlled effectively with known herbicides. Mineral oil compositions containing the polychloroaryl esters in low concentrations of less than 1% by weight will kill broad leaf plants and some grasses while oil compositions containing the polychloroaryl esters in higher concentrations of 1% to 10% by weight can be employed to eradicate plant life of all kinds which is usually found in unpaved driveways, clay tennis courts, highway berms, vacant lots, drainage ditches, barn lots, along fence rows, in meadows and ranges. Plant life killed by such compositions includes species from such major families of the plant kingdom as Gramineae, Solanaceae, Cruciferae and Leguminosa and includes specifically such plant pests as for example wild aster, wild snapdragon, sour grass, golden rod, Queen Ann's Lace, Canadian thistle, dandelion, cinquefoil, dock, Johnson grass, wild onion, pepper weed, annual blue grass, Dallas grass, smut grass, carpet grass, nut grass, burweed, ragweed, plantain, bindweed, lambsquarter, oxalis, foxtail, and shepherd's purse.

The polychloroaryl esters of aliphatic monocarboxylic acids utilized as active ingredients in this invention contain three or more nuclear attached chlorine atoms per benzene ring in the aryl group of the ester. When the aryl group of the ester contains alkyl substituents, one or more of the hydrogens of the alkyl group may also be replaced by chlorine atoms. Thus for example the ester can be a tri-, tetra- or pentachlorophenyl ester; a tetra-, penta-, hexa-, or heptachlorotolyl ester, a tri-, tetra-, penta-, hexa-, hepta-, octa-, or nonachloroxylyl ester, a tetra- to heptachloro naphthyl ester; as well as any of the chloroethylphenyl esters, chloroethyltolyl esters and chloropropylphenyl esters which contain 3 or more chlorine atoms attached to nuclear carbon atoms of the benzene ring. The acid portion of these active ingredients can be derived from the lower aliphatic acids such as formic, acetic, propionic, butyric acids or may be derived from such fatty acids as stearic acid and palmitic acid.

The preferred active ingredients for the compositions of this invention are the pentachlorophenyl esters of monocarboxylic acids having 1 to 6 carbon atoms in the acid residue of the ester. These compounds can be characterized by the following general formula:

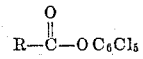

where R is hydrogen or an open-chain hydrocarbon group having one to five carbon atoms.

The active ingredients of the compositions of this invention can be readily and conveniently prepared by methods well known to the art of organic chemical synthesis. For example, they can be prepared by reacting a polychlorinated phenolic compound with an acyl halide of a monocarboxylic acid. The ester is formed through the splitting out of hydrogen chloride. Thus, when pentachlorophenol is reacted with

where R has the significance stated above and X is chlorine, the products resulting from the splitting out of HCl are the preferred active ingredients. Other methods of preparing the the polyhaloaryl esters of monocarboxylic esters are well known to the art.

As representative compounds of the preferred class of active ingredients there may be mentioned pentachlorophenyl formate, pentachlorophenyl acetate, pentachlorophenyl propionate, pentachlorophenyl butyrate, pentachlorophenyl isobutyrate, pentachlorophenyl valerate, pentachlorophenyl beta-methylbutyrate, pentachlorophenyl caproate, pentachlorophenyl beta-dimethylbutyrate, pentachlorophenyl alpha-ethylbutyrate, pentachlorophenyl alpha-methylbutyrate, and pentachlorophenyl alpha-dimethyl propionate among others.

The mineral oil used as the carrier in the herbicidal compositions described herein may be any oil consisting predominantly of hydrocarbons, preferably paraffin hydrocarbons containing 10 to 20 carbon atoms. Such hydrocarbons generally possess a boiling point above 150° C. and a Saybolt viscosity below 200 seconds. Examples of such oils are kerosene, light paraffin base oil, diesel fuel oils, Bunker C fuel oil, and other similar hydrocarbon mixtures whether or not derived from petroleum. In general, the lighter petroleum fractions and especially kerosene are preferably employed in preparing spray compositions for use in temperate climates while the heavier higher molecular weight petroleum oils such as the diesel fuel oils are best suited for formulations to be used in the hotter climates.

Compositions consisting entirely of the polychloroaryl esters of aliphatic monocarboxylic acids in a concentration between 0.01% and 10% by weight dissolved in the carrier oil may be sprayed on plants to produce the herbicidal effect. If desired, however, the polychloroaryl esters can be first dissolved in a small amount of the oil and then the oil solution dispersed in water with the aid of a wetting or dispersing agent to produce an oil-in-water emulsion containing from 0.01% to 10% by weight of the polychloroaryl ester and an oil content of from 1% to 100% of that of the water, and the resulting emulsion sprayed on plant life. In either event I have found that the application of the compositions in amounts such as to provide as little as 1 to 20 pounds of the active ingredient per acre of sprayed area is sufficient to kill a great variety of undesirable weeds and grasses although, of course, lower rates of application of from 0.25 to 1.0 pound per acre or higher rates of application up to 50 pounds per acre of the active ingredient may be employed in some instances.

Suitable dispersing or wetting agents for the preparation of oil-in-water emulsion include those typified by the following general classifications: sodium and potassium salts of fatty acids known as soft and hard soaps; salts of disproportionated abietic acid known as rosin soaps; salts of hydroxyaldehyde acids present in seaweed known as algin soaps; alkali-casein compositions; water-soluble lignin sulfonate salts; long-chain alcohols usually containing 10 to 18 carbon atoms; water-soluble salts of sulfated fatty alcohols containing 10 to 18 carbon atoms; water-soluble salts of sulfated fatty acid amides; water-soluble esters of sulfated fatty acids; water-soluble alkyl sulfonates having 10 to 18 carbon atoms in the alkyl group; water-soluble aryl sulfonates; water-soluble alkyl aryl sulfonates; water-soluble aralkyl sulfonates; water-soluble sorbitan mono-laurate, -palmitate, -stearate, and -oleate; quaternary ammonium alkyl halides; fatty acids saponified with amines and amino alcohols; and others. Dispersing or wetting agents of the above classes are sold under various trade names. Such products are sometimes pure compounds but generally are a mixture of compounds of the same class with some substance as a filler. When one or more of these dispersing agents are employed to prepare the herbicidal compositions described above, it usually will be necessary to use only from about 0.1% to about 5% by weight of the dispersing or wetting agent depending on the efficiency of the dispersing or wetting agent and the quantity of oil to be emulsified.

The following specific examples illustrate the herbicidal properties of the compositions containing polychloroaryl esters of monocarboxylic acids as the essential active ingredient.

*Example I*

Herbicidal compositions containing various amounts of pentachlorophenyl acetate dissolved in insecticide grade kerosene were employed against plants representative of the various plant families to which numerous common weed varieties belong. For comparison, pentachlorophenol was also employed in the same concentrations. A composition containing 0.01% pentachlorophenyl acetate dissolved in kerosene gave a complete kill of radish, tobacco and tomato plants while a composition containing 0.01% by weight of pentachlorophenol did not kill tomato plants. A kerosene spray containing 0.025% pentachlorophenyl acetate killed bean plants but the spray containing 0.025% pentachlorophenol did not kill bean plants. A kerosene spray composition containing 0.1% pentachlorophenyl acetate killed snapdragon, cabbage and buckwheat plants while the spray containing 0.1% pentachlorophenol did not. The compositions containing pentachlorophenol were irritating to the skin and mucous membranes of the operator while those containing pentachlorophenyl acetate were completely non-irritating.

*Example II*

A kerosene spray composition containing 0.5% by weight of pentachlorophenyl propionate was sprayed on tomato, radish, bean, cabbage and blue grass plants. Ten days later all of these plants were dead.

The following are field tests made on numerous weeds growing under natural conditions.

*Example III*

An 0.01 acre plot containing predominantly such weed growth as wild asters, sour grass, golden rod, Queen Ann's Lace, Canadian thistle, dandelion, cinquefoil, and dock among others was sprayed with a composition containing 1.5% by weight of pentachlorophenyl propionate dissolved in kerosene at the rate of five pounds of the active ingredient per acre. A similar 0.01 acre plot containing the same species of weeds was sprayed with a kerosene solution containing 1.5% by weight of pentachlorophenol at the rate of five pounds of pentachlorophenol per acre. These spray compositions were applied during the early part of June when the weed growth was young and succulent. There was no apparent effect on the weeds in either plot five hours after spraying. The weed plots were examined daily after treatment. On the fourth day it was noted that the sour grass in the plot treated with pentachlorophenyl propionate was dead while the sour grass in the other plot showed only slight injury. On the fifth day after treatment all the named weeds in the plot treated with pentachlorophenyl propionate were dead while the weeds in the second plot showed only slight injury with only a scattered kill of individual weed plants.

*Example IV*

A number of tests were carried out on large acreage plots with compositions containing various concentrations of pentachlorophenyl acetate. These large test plots contained predominately Johnson grass, aster, goldenrod, wild onion, broad and curly leaf dock, pepper weed, annual blue grass, Dallas grass, smut grass, carpet grass, nut grass and burweed. The compositions sprayed on these large acreage test plots were prepared by dissolving the active ingredient in insecticide grade kerosene. These solutions were all applied at a rate of 70-gallons per acre. Test plot A was treated with a kerosene solution containing 4% by weight of pentachlorophenyl acetate (20 lbs. of the ester per acre). All weed plants in this test plot were dead 7 days after treatment and no new weed seedling appeared for more than 16 days. Test plot B was treated with a kerosene solution containing 0.9% by weight of pentachlorophenyl acetate. Seven days after treatment all weeds in this plot were dead, but 16 days after treatment numerous seedlings appeared among dead plants. Two other test plots, test plots C and D, were treated with kerosene solutions containing 0.4% and 0.2% by weight respectively of pentachlorophenyl acetate. All the weeds in these two plots were killed within seven days, but eight days after the treatment weed seedlings began to appear. In a control plot E sprayed at the same rate with kerosene only, the weeds were not killed or even injured seven days after the treatment.

*Example V*

Large acreage plots containing primarily Johnson grass but also containing aster and golden rod were sprayed with kerosene solutions containing either pentachlorophenyl acetate or pentachlorophenol. Test plot F was sprayed at the rate of 70 gallons of solution per acre with a solution containing 0.4% pentachlorophenyl acetate. Test plot G was sprayed at the rate of 70 gallons of solution per acre with a solution containing 0.2% pentachlorophenyl acetate. Test plot H was sprayed at the rate of 70 gallons of solution per acre with a solution containing 1% pentachlorophenol. In test plot F five days after treatment all weed plants were dead and the entire Johnson grass plants were killed down to their rhizomes. In test plot G seven days after treatment all the weeds were dead and the Johnson grass plants were likewise killed down to their rhizomes. In test plot H pentachlorophenol killed only the leaf surface which it had contacted, but the grass plants completely recovered in a few days.

*Example VI*

A plot containing predominantly such weed growth as wild asters, sour grass, golden rod, Queen Ann's Lace, Canadian thistle, plantain, dandelion, curly leaf dock and ragweed was sprayed with an oil-in-water emulsion containing 2% by weight of pentachlorophenyl propionate, 1% by weight of an alkyl phenoxy polyether alcohol as the dispersing agent, 20% by weight of kerosene and 77% by weight of water at a rate of five pounds of the active ingredient per acre. The spray formulation was applied while the weed growth was young and succulent. Five days after treatment all the weeds were dead.

The activity of specific polychlorophenyl esters of aliphatic monocarboxylic acids has been illustrated in the above specific examples, but any of the other specific members of the preferred esters hereinbefore named will possess substantially the same activity as herbicides. The other members of the preferred group can be used against weed growth with substantially the same results as indicated in the specific examples.

Although I have disclosed specific examples of my invention I do not desire or intend to limit myself solely thereto for as hitherto stated, the precise proportions of the ingredients used can be varied without departing from the spirit and scope of the invention as defined in the appended claims.

I claim:

1. A herbicidal composition which comprises as the essential active ingredient 0.01% to 10% by weight of a polychloroaryl ester of an aliphatic monocarboxylic acid said ester containing at least three nuclear attached chlorine atoms per benzene ring in the aryl group and, as a carrier therefor, a mineral oil consisting predominantly of hydrocarbons containing from 10 to 20 carbon atoms.

2. A herbicidal composition which comprises as the essential active ingredient 0.01% to 10% by weight of a pentachlorophenyl ester of an aliphatic monocarboxylic acid and, as a carrier therefor, a mineral oil consisting predominantly of hydrocarbons containing from 10 to 20 carbon atoms.

3. A herbicidal composition which comprises as the essential active ingredient 0.01% to 10% by weight of pentachlorophenyl acetate and, as a carrier therefor, a mineral oil consisting predominantly of hydrocarbons containing from 10 to 20 carbon atoms.

4. A herbicidal composition which comprises as the essential active ingredient 0.01% to 10% by weight of pentachlorophenyl propionate and, as a carrier therefor, a mineral oil consisting predominantly of hydrocarbons containing from 10 to 20 carbon atoms.

5. The method of killing plant life which comprises applying to the foliage of herbaceous plant life a composition containing a polychloroaryl ester of a monocarboxylic acid said ester containing at least three nuclear attached chlorine atoms per benzene ring in the aryl group.

6. The method of killing plant life which comprises applying to the foliage of herbaceous plant life a composition containing a pentachlorophenyl ester of an aliphatic monocarboxylic acid.

7. The method of killing plant life which comprises applying to the foliage of herbaceous plant life a composition containing pentachlorophenyl acetate.

8. The method of killing plant life which comprises applying to the foliage of herbaceous plant life a composition containing pentachlorophenyl propionate.

LUTHER L. BAUMGARTNER.

REFERENCES CITED

The following references are of record in the file of this patent:

UNITED STATES PATENTS

| Number | Name | Date |
|---|---|---|
| 2,430,017 | Houk | Nov. 4, 1947 |